US010488971B2

(12) United States Patent
Kim et al.

(10) Patent No.: US 10,488,971 B2
(45) Date of Patent: Nov. 26, 2019

(54) DISPLAY DEVICE WITH BUILT-IN TOUCH SCREEN AND DRIVING METHOD THEREOF

(71) Applicant: LG DISPLAY CO., LTD., Seoul (KR)

(72) Inventors: Changhoon Kim, Daegu (KR); Jungjin Ahn, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 15/390,904

(22) Filed: Dec. 27, 2016

(65) Prior Publication Data

US 2018/0095583 A1     Apr. 5, 2018

(30) Foreign Application Priority Data

Sep. 30, 2016   (KR) ........................ 10-2016-0126690

(51) Int. Cl.
| | |
|---|---|
| *G06F 3/041* | (2006.01) |
| *G02F 1/1333* | (2006.01) |
| *G02F 1/1362* | (2006.01) |
| *G06F 3/044* | (2006.01) |

(52) U.S. Cl.
CPC ........ *G06F 3/0416* (2013.01); *G02F 1/13338* (2013.01); *G02F 1/136286* (2013.01); *G06F 3/044* (2013.01); *G06F 3/0412* (2013.01)

(58) Field of Classification Search
CPC .................................................. G06F 3/0416
USPC ....................................................... 345/173
See application file for complete search history.

(56) References Cited

U.S. PATENT DOCUMENTS

| | | | |
|---|---|---|---|
| 9,448,452 B2 | 9/2016 | Lee | |
| 2005/0243044 A1 | 11/2005 | Kang et al. | |
| 2006/0012555 A1* | 1/2006 | Tokumura | ............ G09G 3/3648 345/98 |
| 2006/0081850 A1 | 4/2006 | Lee et al. | |

(Continued)

FOREIGN PATENT DOCUMENTS

| | | |
|---|---|---|
| EP | 2 530 516 A1 | 12/2012 |
| JP | H11-052427 A | 2/1999 |

(Continued)

OTHER PUBLICATIONS

Japanese Office Action dated Oct. 31, 2017, issued in corresponding Japanese Application No. 2016-255120.

(Continued)

*Primary Examiner* — Long D Pham
(74) *Attorney, Agent, or Firm* — Morgan, Lewis & Bockius LLP

(57) ABSTRACT

Provided are a display device with a built-in touch screen and a driving method thereof. A display device with a built-in touch screen includes: a substrate including a display area, (M*n) pixels, each including m subpixels in the display area, where: n is a natural number, m is 3 or 4, and M is an even number when m is 3 and is a natural number when m is 4, [(M*m/2)+1] data lines, 2n gate lines crossing the data lines, and multiple touch electrodes, each of n rows of the subpixels being defined by an odd- and an even-numbered gate line that are continuous among the 2n gate lines, a horizontal line for each of the n rows of the subpixels being connected to [(M*m/2)−1] data lines, and each data line is shared by a pair of subpixels.

19 Claims, 14 Drawing Sheets

(56) References Cited

U.S. PATENT DOCUMENTS

| | | |
|---|---|---|
| 2006/0164350 A1 | 7/2006 | Kim et al. |
| 2009/0231255 A1* | 9/2009 | Tanimoto .......... G02F 1/136286 345/87 |
| 2011/0069057 A1* | 3/2011 | Cho ...................... G09G 3/3648 345/211 |
| 2011/0310036 A1 | 12/2011 | Juan et al. |
| 2012/0212401 A1 | 8/2012 | Bae et al. |
| 2012/0306732 A1 | 12/2012 | Sugihara et al. |
| 2013/0057495 A1* | 3/2013 | Wang ...................... G06F 3/044 345/173 |
| 2014/0204006 A1 | 7/2014 | Kang et al. |
| 2014/0320767 A1 | 10/2014 | Xu et al. |
| 2015/0177880 A1 | 6/2015 | Shin et al. |
| 2015/0185929 A1 | 7/2015 | Xu |
| 2015/0187293 A1 | 7/2015 | Yoo et al. |
| 2015/0309634 A1* | 10/2015 | Lee ...................... G06F 3/0412 345/173 |
| 2016/0004371 A1 | 1/2016 | Kim et al. |
| 2016/0018916 A1 | 1/2016 | Lee et al. |
| 2016/0188040 A1* | 6/2016 | Shin ........................ G06F 3/047 345/174 |
| 2017/0123581 A1* | 5/2017 | Yang ...................... G06F 3/0416 |
| 2017/0249046 A1* | 8/2017 | Hirosawa .......... G02F 1/133345 |

FOREIGN PATENT DOCUMENTS

| | | |
|---|---|---|
| JP | 2005-309438 A | 11/2005 |
| JP | 2006-106745 A | 4/2006 |
| JP | 2006-178461 A | 7/2006 |
| JP | 2009-151258 A | 7/2009 |
| JP | 2012-173742 A | 9/2012 |
| JP | 2015-122057 A | 7/2015 |
| JP | 2015-129907 A | 7/2015 |
| JP | 2016-024805 A | 2/2016 |
| TW | 201200935 A1 | 1/2012 |

OTHER PUBLICATIONS

Taiwanese Office Action dated Nov. 17, 2017, issued in corresponding Taiwanese Application No. 105144199.

Extended European Search Report dated Jul. 27, 2017, issued in corresponding European Application No. 16207645.9.

* cited by examiner

DISPLAY DEVICE WITH BUILT-IN TOUCH SCREEN AND DRIVING METHOD THEREOF

CROSS-REFERENCE TO RELATED APPLICATION(S)

This application claims the benefit of Korean Patent Application No. 10-2016-0126690, filed on Sep. 30, 2016, the entire disclosure of which is hereby incorporated by reference herein.

BACKGROUND

1. Technical Field

The present disclosure relates to a display device, and more particularly to a display device with a built-in touch screen and a driving method thereof.

2. Discussion of the Related Art

With advancement of an information-oriented society, various kinds of demands for display devices for displaying images have increased, and various types of display devices have been used, such as a liquid crystal display device (LCD), a plasma display panel (PDP), and an organic light-emitting display device (OLED). Such display devices may provide a touch-based input system that enables a user to easily and intuitively input information or commands in addition to a normal input system using buttons, keyboards, mouse, and the like.

To provide such a touch-based input system, it is necessary to detect a user's touch and to accurately detect a touched coordinate. For this purpose, touch sensing techniques employing a touch scheme of a resistance membrane scheme, a capacitance scheme, an electromagnetic induction scheme, an infrared scheme, and/or an ultrasonic scheme have been provided.

Techniques for incorporating a touch sensor into a display device have been developed to apply a touch screen to the display device. Particularly, an in-cell display device using a common electrode formed on a lower substrate as a touch electrode has been developed.

A display device includes a gate driver for driving gate lines GL and a data driver for driving data lines DL. Particularly, the data driver has a relatively high price in comparison with other components. Thus, a double-rate driving (DRD) structure capable of decreasing a size of an integrated circuit (IC) in the data driver has been proposed.

According to such a display device with the DRD structure, the number of gate lines GL doubles (n→2n) and the number of data lines DL can be halved (m→m/2).

However, when the DRD structure is applied to a display device with a built-in touch screen, the data lines DL and touch sensing lines are alternately arranged and the touch sensing lines are located between the touch electrodes. Accordingly, there is a problem in that a stained defect is generated in boundaries between the touch electrodes.

SUMMARY

Accordingly, the present disclosure is directed to a display device with a built-in touch screen and a driving method thereof that substantially obviate one or more of the problems due to limitations and disadvantages of the related art.

An object of the present disclosure is to provide a display device with a built-in touch screen in which touch sensing lines are not located in boundaries between touch electrodes by arranging first and second dummy subpixels in a display panel and shifting the touch electrodes and a driving method thereof.

Another object of the present disclosure is to provide a display device with a built-in touch screen which can be driven using a mixed method of Z inversion and reverse Z(S) inversion of a double-rate driving (DRD) system to decrease the number of channels (e.g., the number of data lines) of a data driver and to decrease power consumption and a driving method thereof.

Another object of the present disclosure is to provide a display device with a built-in touch screen in which a horizontal defect generated in a horizontal direction is prevented by adjusting colors corresponding to strong-charged subpixels and weak-charged subpixels among subpixels arranged in a display panel and a driving method thereof.

Additional features and advantages will be set forth in the description that follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided a display device with a built-in touch screen, including: a substrate including a display area, (M*n) pixels, each including m subpixels in the display area, where: n is a natural number, m is 3 or 4, and M is an even number when m is 3 and is a natural number when m is 4, [(M*m/2)+1] data lines on the substrate, 2n gate lines that cross the data lines on the substrate, and a plurality of touch electrodes on the substrate, wherein each of n rows of the subpixels is defined by an odd-numbered gate line and an even-numbered gate line that are continuous among the 2n gate lines, and wherein a horizontal line corresponding to each of the n rows of the subpixels is connected to [(M*m/2)−1] data lines, such that each data line is shared by a pair of subpixels.

In another aspect, there is provided a driving method of a display device with a built-in touch screen, the display device comprising: a substrate comprising a display area, (M*n) pixels, each comprising m subpixels in the display area, where: n is a natural number, m is 3 or 4, and M is an even number when m is 3 and is a natural number when m is 4, [(M*m/2)+1] data lines on the substrate, 2n gate lines that cross the data lines on the substrate, and a plurality of touch electrodes on the substrate, each of n rows of the subpixels being defined by an odd-numbered gate line and an even-numbered gate line that are continuous among the 2n gate lines, a horizontal line corresponding to each of the n rows of the subpixels being connected to [(M*m/2)−1] data lines, such that each data line is shared by a pair of subpixels, the driving method comprising: driving the subpixels arranged in each horizontal line using a mixture of: driving from left to right of each data line; and driving from right to left of each data line.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the disclosure.

Figure 1:
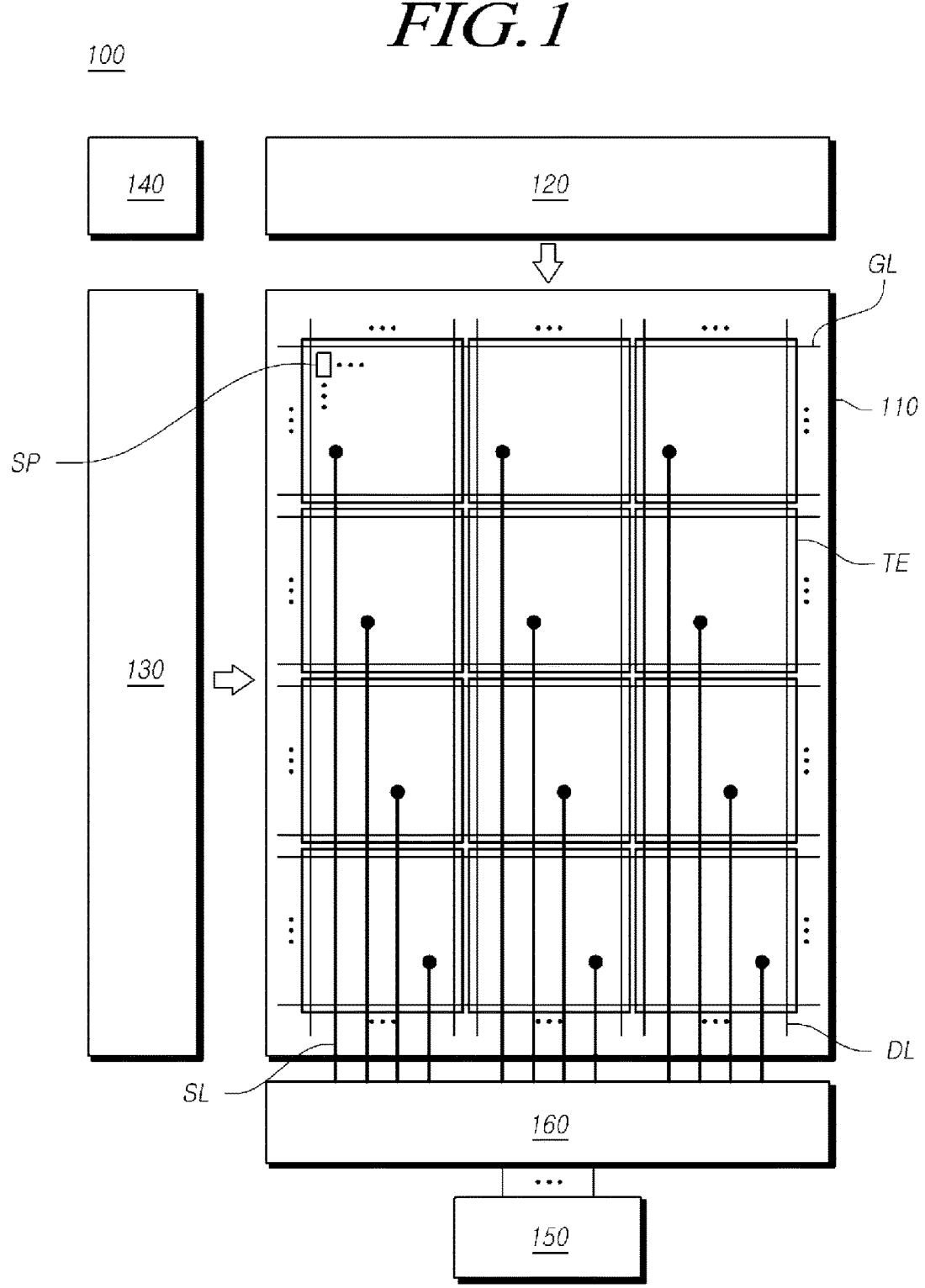
FIG. 1 is a diagram illustrating a configuration of a display device with a built-in touch screen according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

FIG. 1 is a diagram illustrating a configuration of a display device with a built-in touch screen 100 according to the present disclosure.

With reference to FIG. 1, a display device with a built-in touch screen 100 according to the present disclosure is a display device that can provide an image display function and a touch sensing function. The display device with a built-in touch screen 100 may be a medium-sized or large-sized device, such as a TV or a monitor, having a touch sensing function for a touch input, or may be a mobile device, such as a smartphone or a tablet.

With further reference to FIG. 1, the display device with a built-in touch screen 100 may include a display panel 110, a data driver 120, a gate driver 130, and a controller 140 to provide a display function. The display panel 110 may include a plurality of data lines DL extending in a first direction (for example, a column direction) and a plurality of gate lines GL extending in a second direction (for example, a row direction). The data driver 120 may drive the data lines DL. Here, the data driver 120 is also referred to as a "source driver." The gate driver 130 may drive the gate liens GL. Here, the gate driver 130 is also referred to as a "scan driver."

The controller 140 may control the data driver 120 and the gate driver 130 by supplying various control signals to the data driver 120 and the gate driver 130. The controller 140 may start scanning at an appropriate timing of each frame, may switch externally input image data into a data signal format which is used by the data driver 120, may output the switched image data, and may control the data driving at an appropriate timing corresponding to the scanning. The controller 140 may be a timing controller, which is used in normal display techniques, or may be a controller that performs control functions including a timing controller function.

The gate driver 130 may sequentially supply a scan signal of an ON voltage or an OFF voltage to the gate lines GL under the control of the controller 140. When a specific gate line is selected by the gate driver 130, the data driver 120 may convert image data received from the controller 140 into an analog data voltage, and may supply the analog data voltage to the data lines DL.

As illustrated in the FIG. 1 example, the data driver 120 may be located on only one side (for example, an upper side or a lower side) of the display panel 110. However, the data driver 120 may be located on both sides (for example, the upper side and the lower side) of the display panel 110, depending on a driving method, a panel design method, or the like. The gate driver 130 may be located on only one side (for example, a right side or a left side) of the display panel 110, or may be located on both sides (for example, the right side and the left side) of the display panel 110, depending on a driving method, a panel design method, or the like. The controller 140 may receive various timing signals, including a vertical synchronization signal Vsync, a horizontal synchronization signal Hsync, an input data enable (DE) signal, and a clock signal CLK along with input image data from the outside (for example, a host system).

The display device with a built-in touch screen 100 may be any of various types of devices such as a liquid crystal display device (LCD), an organic light-emitting display device (OLED), and a plasma display device. For example, the display device with a built-in touch screen 100 may be a liquid crystal display device based on an in-plane switching (IPS) system in which liquid crystal molecules are aligned horizontally and rotate to display an image, e.g., as a screen, and which has advantageous merits in high resolution, low power, wide viewing angle, and the like. For example, the display device with a built-in touch screen 100 may be a liquid crystal display device based on an advanced high performance-IPS (AH-IPS) system.

Each of subpixels SP arranged in the display panel 110 may include circuit elements such as transistors. In addition, the display device with a built-in touch screen 100 includes a touch system for providing a touch sensing function. With further reference to FIG. 1, the touch system may include a plurality of touch electrodes TE that may function as touch sensors, and a touch circuit 150 that may drive the touch electrodes TE to sense a touch.

The touch circuit 150 can sequentially drive the touch electrodes TE by sequentially supplying a touch driving signal to the touch electrodes TE. Thereafter, the touch circuit 150 may receive a touch sensing signal from the touch electrode to which the touch driving signal has been applied. The touch circuit 150 can detect a touch and a touch coordinate based on the touch sensing signals received from the touch electrodes TE.

For example, the touch driving signal may have a waveform of a pulse-modulated signal having two or more voltage levels. The touch sensing signals received from the touch electrodes TE can vary depending on whether the corresponding touch electrode or the periphery thereof is touched by a pointer such as a finger or a pen. The touch circuit 150 can detect a capacitance variation (or a voltage variation or a charge variation) or the like in the touch electrodes TE based on the touch sensing signals to detect a touch and a touch coordinate.

A touch sensing line SL may be connected to each touch electrode TE to supply the touch driving signal to the touch electrodes TE. To sequentially supply the touch driving signal to the touch electrodes TE, the touch system may further include a switch circuit 160 that sequentially connects the touch sensing lines SL connected to the touch electrodes TE to the touch circuit 150. The switch circuit 160 may include at least one multiplexer.

Each touch electrode TE may be formed in a block shape. Each touch electrode TE may have a size equal to or corresponding to the size of an area of one subpixel SP. Alternatively, each touch electrode TE may have a size larger than the size of the area of one subpixel SP, as illustrated in the FIG. 1 example. That is, an area of each touch electrode TE may have a size corresponding to the areas of two or more subpixels SP. Embodiments are not limited thereto.

The touch electrodes TE may be built in the display panel 110. The display panel 110 can be said to have a touch screen or a touch screen panel built therein. The display panel 110 may be an in-cell type or on-cell type display panel with a built-in touch screen. The display device with a built-in touch screen 100 according to an embodiment may operate in a display mode in which a display function is provided, or may operate in a touch mode in which a touch sensing function is provided.

The touch electrodes TE may operate as touch sensors in a touch-mode section, and may be used as display-mode electrodes in a display-mode section. For example, in the display-mode section, the touch electrodes TE can operate as common electrodes to which a common voltage Vcom is applied, and which are an example of the display-mode electrodes. Here, the common voltage Vcom is a voltage corresponding to a pixel voltage which is applied to a pixel electrode.

Figure 2:
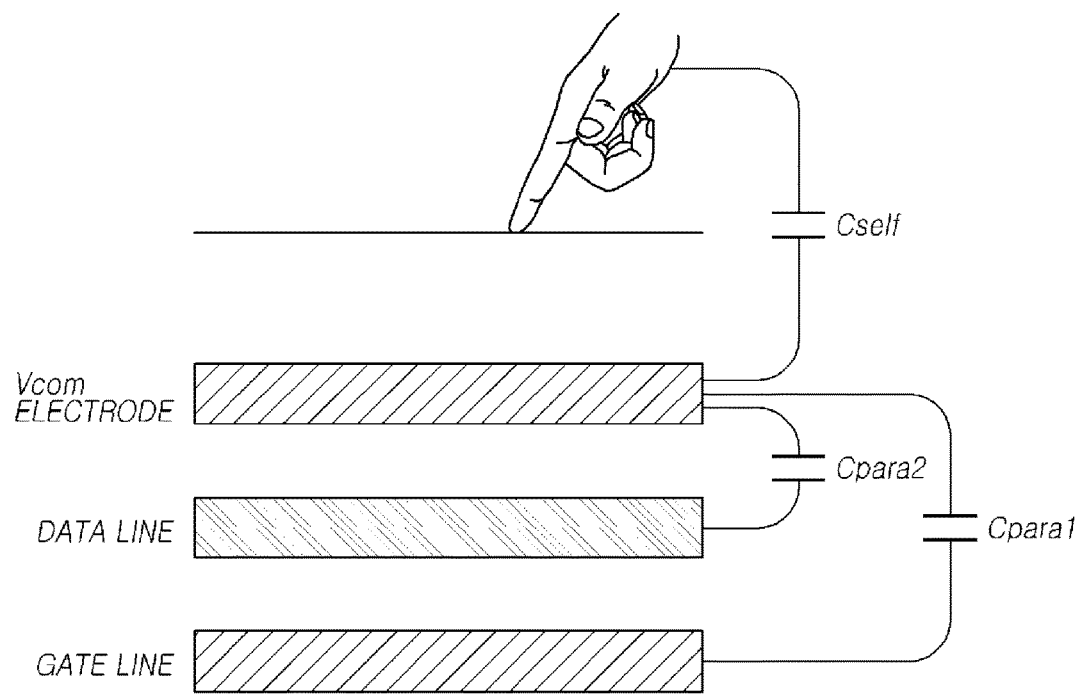
FIG. 2 is a diagram illustrating capacitance components that are generated in a touch mode in a display device with a built-in touch screen according to an embodiment of the present disclosure.

FIG. 2 is a diagram illustrating capacitance components that are generated in a touch mode in a display device with a built-in touch screen according to an embodiment of the present disclosure.

With reference to FIG. 2, the touch electrodes TE that may function as touch electrodes in the touch mode and that may function as common electrodes (Vcom electrodes) forming a liquid crystal capacitor along with the pixel electrode in the display mode may form a self-capacitance Cself along with a pointer, such as a finger or a pen, to detect a touch and a touch coordinate in the touch mode. On the other hand, the touch electrodes TE functioning as the common electrodes can form parasitic capacitance Cpara1 and Cpara2 along with the gate lines and the data lines, which are much smaller than the self-capacitance, and thus can be ignored.

Figure 3:
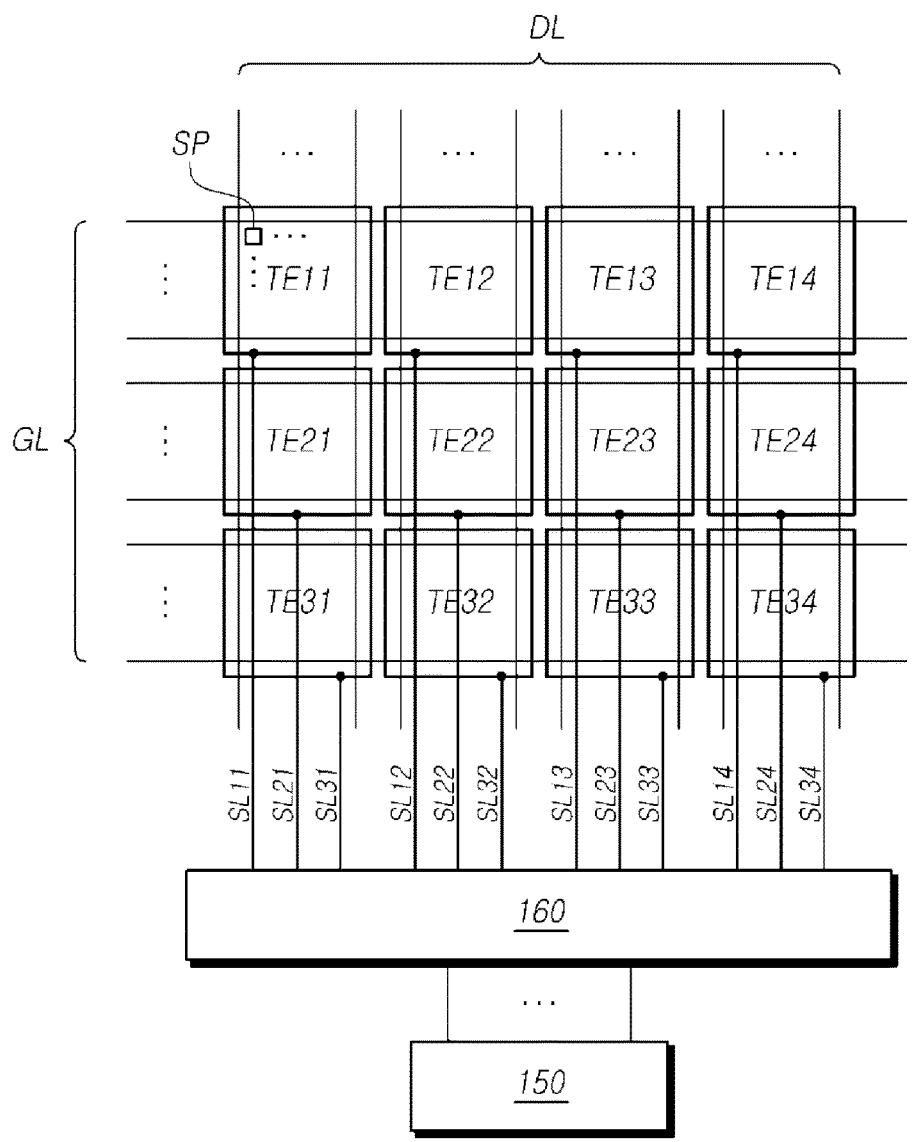
FIG. 3 is a plan view of a display panel included in a display device with a built-in touch screen according to an embodiment of the present disclosure.

FIG. 3 is a plan view of a display panel included in a display device with a built-in touch screen according to an embodiment of the present disclosure.

An application method of the common voltage and the touch driving signal to the touch electrodes TE11 to TE14, TE21 to TE24, and TE31 to TE34 functioning as both the common electrodes and the touch electrodes, an application method of the data voltage and the touch driving signal (or a signal corresponding thereto) to the data lines DL, and an application method of the data voltage and the touch driving signal (or a signal corresponding thereto) to the gate lines GL will be described below in more detail.

With reference to FIG. 3, a plurality of data lines DL, a plurality of gate lines GL, and a plurality of touch electrodes TE11 to TE14, TW21 to TE24, and TE31 to TE34 may be formed in the display panel 110 as described above. The display panel 110 may operate in the display mode or may operate in the touch mode as described above.

The data lines DL and the gate lines GL formed in the display panel 110 may be configured to enable the display panel 110 to function as a display panel for displaying an image. The touch electrodes TE11 to TE14, TW21 to TE24, and TE31 to TE34 formed in the display panel 110 may be configured to enable the display panel 110 to function as a display panel and a touch screen panel.

For example, when the display panel 110 functions as a display panel, that is, when the driving mode of the display panel 110 is the display mode, the touch electrodes TE11 to TE14, TW21 to TE24, and TE31 to TE34 may be supplied with a common voltage Vcom and may function as common electrodes (also referred to herein as a "Vcom electrode") that may be opposing pixel electrodes (not illustrated).

When the display panel 110 functions as a touch screen panel, that is, when the driving mode of the display panel 110 is the touch mode, the touch electrodes TE11 to TE14, TW21 to TE24, and TE31 to TE34 may be supplied with a touch driving voltage, may form a capacitor along with a touch pointer (such as a finger or a pen), and may function as touch electrodes for measuring capacitance of the formed capacitor. In other words, the touch electrodes TE11 to TE14, TW21 to TE24, and TE31 to TE34 may function as the common electrode in the display mode, and may function as the touch electrodes in the touch mode.

The touch electrodes TE11 to TE14, TW21 to TE24, and TE31 to TE34 may be supplied with the common voltage Vcom in the display mode, and may be supplied with the touch driving signal in the touch mode. Accordingly, as illustrated in FIG. 3, the touch electrodes TE11 to TE14, TW21 to TE24, and TE31 to TE34 may be connected to touch sensing lines SL11 to SL14, SL21 to SL24, and SL31 to SL34 for transmission of a common voltage or for transmission of a touch driving signal to the touch electrodes TE11 to TE14, TW21 to TE24, and TE31 to TE34.

Accordingly, in the touch mode, a touch driving signal Vtd generated by the touch circuit 150 and the switch circuit 160 may be applied to all or some of the touch electrodes TE11 to TE14, TW21 to TE24, and TE31 to TE34 via the touch sensing lines SL11 to SL14, SL21 to SL24, and SL31 to SL34. In the display mode, the common voltage Vcom supplied from a common voltage supply unit (not illustrated) may be applied to the touch electrodes TE11 to TE14, TW21 to TE24, and TE31 to TE34 via the touch sensing lines SL11 to SL14, SL21 to SL24, and SL31 to SL34.

With reference to FIG. 3, one subpixel SP may be defined to correspond to each intersection of the data lines DL and the gate lines GL formed in the display panel 110. Here, each subpixel may be one of a red (R) subpixel a green (G) subpixel, a blue (B) subpixel, and a white (W) subpixel. Embodiments are not limited thereto.

With reference to FIG. 3, in an area in which each of the touch electrodes TE11 to TE14, TW21 to TE24, and TE31 to TE34 functioning as the common electrodes and the touch electrodes is formed, two or more subpixels SP can be defined. That is, one of the touch electrodes TE11 to TE14, TW21 to TE24, and TE31 to TE34 may correspond to two or more subpixels SP.

For example, in one area (e.g., a unit touch electrode area) in which each of the touch electrodes TE11 to TE14, TW21 to TE24, and TE31 to TE34 functioning as the common electrodes and the touch electrodes is formed, (24*3) data lines DL and 24 gate lines GL may be arranged to define (24*3*24) subpixels SP.

On the other hand, each of the touch electrodes TE11 to TE14, TW21 to TE24, and TE31 to TE34 functioning as the common electrodes and the touch electrodes may be a block-shaped pattern or may have a pectinate (or comb-like) pattern in an area corresponding to each subpixel SP in some cases. An embodiment can be applied to a case in which each of the touch electrodes TE11 to TE14, TW21 to TE24, and TE31 to TE34 functioning as the common electrodes and the touch electrodes is a pattern having a pectinate (or comb-like) portion. Embodiments are not limited to these shapes.

Figure 4:
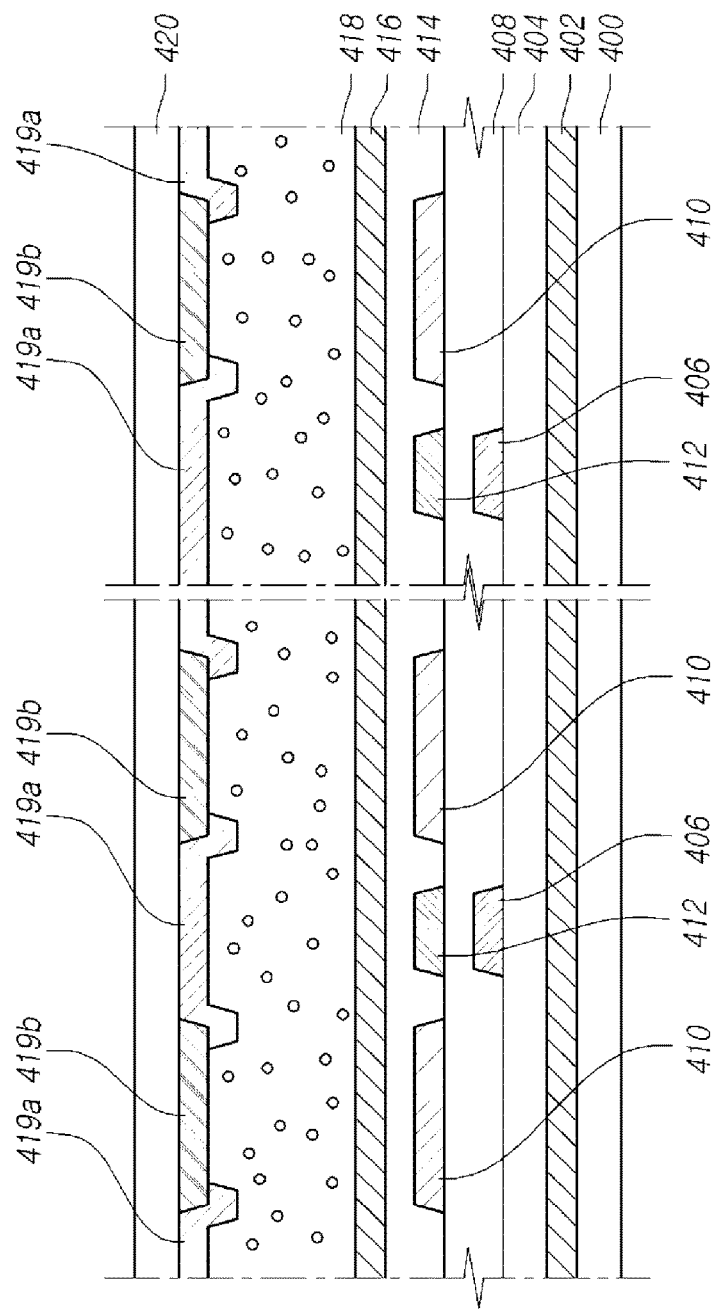
FIG. 4 is a cross-sectional view of a display panel when the display device with a built-in touch screen, according to an embodiment of the present disclosure, is a liquid crystal display device.

FIG. 4 is a cross-sectional view of a display panel when the display device with a built-in touch screen, according to an embodiment of the present disclosure, is a liquid crystal display device.

FIG. 4 illustrates an example of an area in which one of the touch electrodes TE11 to TE14, TW21 to TE24, and TE31 to TE34 functioning as the common electrodes and the touch electrodes is formed. In the display panel 110 of the display device with a built-in touch screen 100, gate lines 402 may be formed in a first direction (e.g., a horizontal direction, which is a lateral direction in the FIG. 3 example) on a lower substrate 400, and a gate insulator 404 may be formed thereon.

Data lines 406 may be formed in a second direction (e.g., a vertical direction, which is a direction perpendicular to the drawing surface of the FIG. 3 example) on the gate insulator 404, and a first protective layer 408 may be formed thereon. Pixel electrodes 410 of subpixel areas and touch sensing lines 412 may be formed on the first protective layer 408 and a second protective layer 414 may be formed thereon.

The touch sensing lines 412 may be connected from the touch electrodes TE11 to TE14, TW21 to TE24, and TE31 to TE34 functioning as the common electrodes and the touch electrodes to the switch circuit 160. The touch sensing lines 412 may transmit the common voltage Vcom generated by the common voltage supply unit to the touch electrodes TE11 to TE14, TW21 to TE24, and TE31 to TE34 in the display mode, and may transmit the touch driving signal generated by the touch circuit 150 and the switch circuit 160 to the touch electrodes TE11 to TE14, TW21 to TE24, and TE31 to TE34 in the touch mode.

One electrode 416 functioning as the common electrode and the touch electrode may be formed on the second protective layer 414, and a liquid crystal layer 418 may be formed thereon. The electrode 416 functioning as the common electrode and the touch electrode may be one of the touch electrodes TE11 to TE14, TW21 to TE24, and TE31 to TE34, and may be a pattern having a block shape. An upper substrate 420 in which black matrixes 419a and color filters 419b may be formed may be located on the liquid crystal layer 418.

Although a liquid crystal display device is illustrated in FIG. 4, but embodiments are not limited to the liquid crystal display device. Embodiments can be applied to various display devices that can be coupled to a touch panel.

Figure 5:
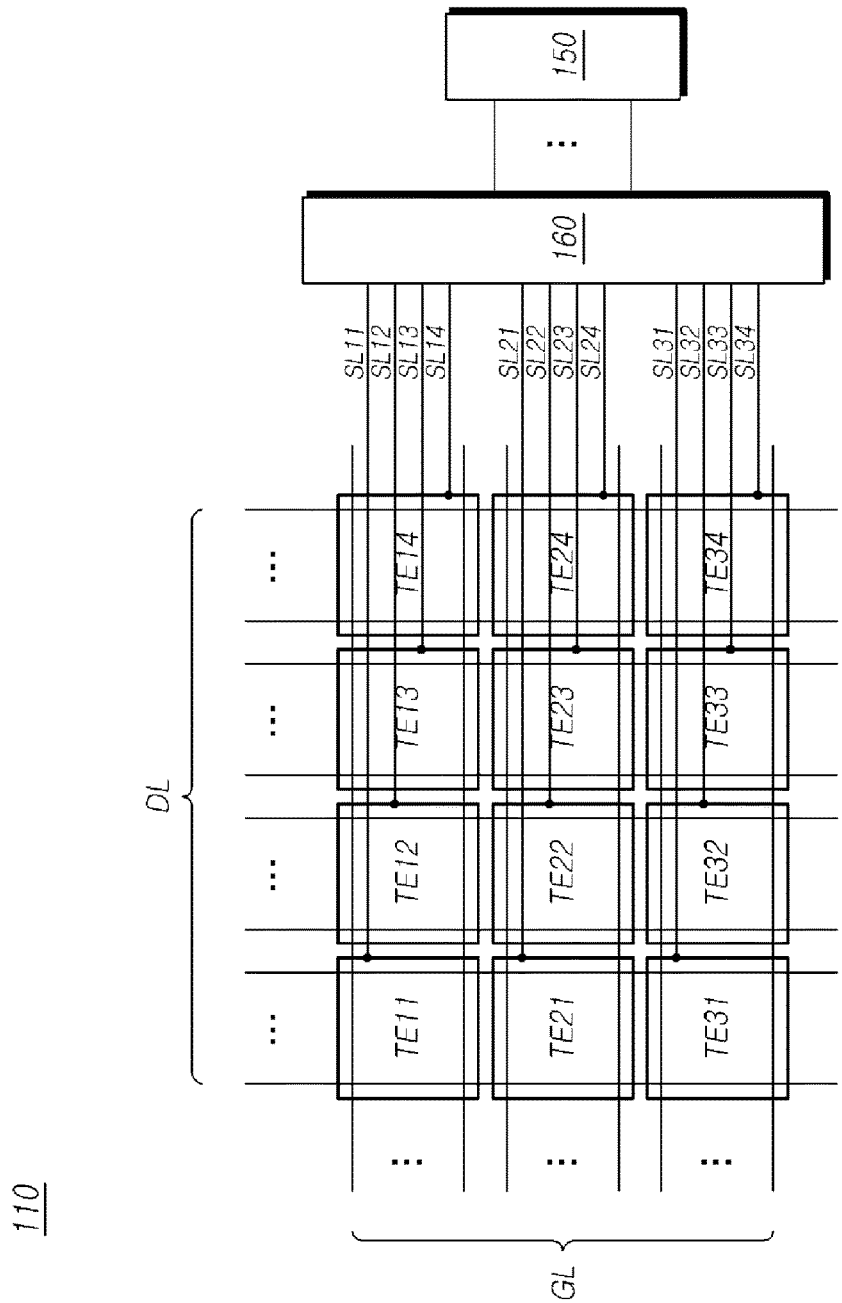
FIG. 5 is a plan view of a display panel included in a display device with a built-in touch screen according to an embodiment of the present disclosure.

FIG. 5 is a plan view of a display panel included in a display device with a built-in touch screen according to an embodiment of the present disclosure.

With reference to FIG. 5, unlike in the example of FIG. 3, the touch sensing lines SL11 to SL14, SL21 to SL24, and SL31 to SL34 connected to the touch electrodes TE11 to TE14, TW21 to TE24, and TE31 to TE34 to transmit the touch driving signal or the common voltage may be formed parallel to the second direction (for example, the horizontal direction) in which the gate lines GL may be formed.

In this case, the touch driving signal generated by the touch circuit 150 and the switch circuit 160 illustrated in FIG. 1 or the common voltage generated or supplied by the common voltage supply unit may be transmitted to all or some of the touch electrodes TE11 to TE14, TW21 to TE24, and TE31 to TE34 via the touch sensing lines SL11 to SL14, SL21 to SL24, and SL31 to SL34 formed in parallel to the gate lines.

Figure 6:
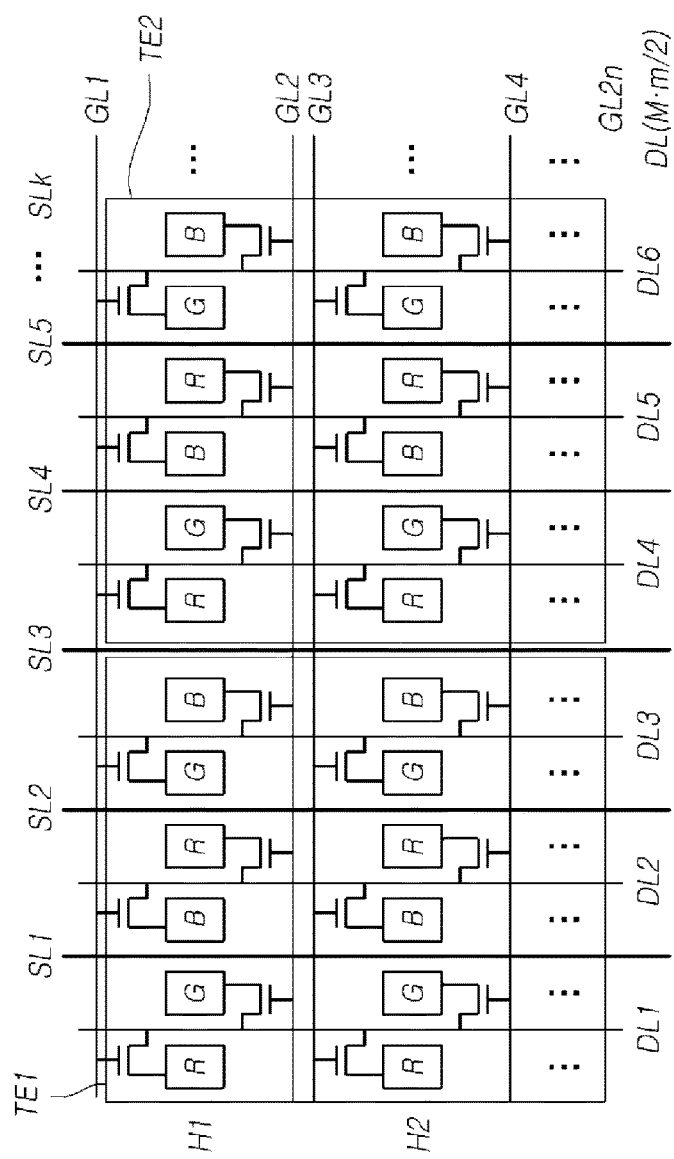
FIG. 6 is a diagram illustrating an arrangement of sub-pixels in a display device with a built-in touch screen according to an embodiment of the present disclosure.

FIG. 6 is a diagram illustrating an arrangement of subpixels in a display device with a built-in touch screen according to an embodiment of the present disclosure.

With reference to FIG. 6, the display device with a built-in touch screen 100 may include red (R) subpixels, green (G) subpixels, and blue (B) subpixels. That is, the display device with a built-in touch screen 100 may include a substrate that may be partitioned into a display area (e.g., an active area) and a non-display area (e.g., a pad area), and a plurality of subpixels may be arranged in the display area. In the present example, it is presumed that the display panel or the substrate is partitioned into a display area and a non-display area.

The display device with a built-in touch screen may be driven by a double-rate driving (DRD) scheme and a Z-inversion driving scheme to reduce the number of output channels (e.g., the number of data lines) of the data driver and to reduce power consumption.

The DRD scheme is a scheme of driving (M*n) pixels each including m subpixels using (M*m/2) data lines DL1, DL(M*m/2) (where m is 3 or 4, and M is an even number when m is 3 and is a natural number when m is 4, where M refers to the number of unit pixels each including RGB subpixels or RGBW subpixels) and 2n gate lines and is a technique of decreasing the number of output channels of the data driver by decreasing the number of data lines.

The Z-inversion driving scheme is a technique of driving the subpixels in a dot inversion scheme and in a line inversion scheme to reduce power consumption of the data driver by applying data voltages having different polarities to neighboring data lines in one frame period and causing subpixels in two columns to share one data line and to be connected thereto in a zigzag manner.

In the present example, it is presumed that M includes red (R), green (G), and blue (B) subpixels. The same can be applied to a case in which M includes red (R), green (G), blue (B), and white (W) subpixels.

In a connection structure of the subpixels arranged in a display device with a built-in touch screen according to an embodiment, the (M*m/2) data lines DL1, ..., DL(M*m/2) and the 2n (where n is a natural number) gate lines may intersect each other in the display panel to define (m*n) subpixels. The data lines DL1, DL2, ..., DL(M*m/2) may be arranged to extend in the first direction (the column direction), the gate lines GL1, GL2, ..., GL(2n) may be arranged to extend in the second direction (the row direction), and the touch sensing lines SL1, SL2, SLk (where k is a natural number) along with the data lines DL1, DL2, ..., DL(M*m/2) may be alternately arranged with the subpixels arranged in one column extending in the first direction.

The touch electrodes TE1, TE2, etc. may be arranged to overlap the subpixels and each touch electrode TE1, TE2, etc. may be disposed to overlap one or more subpixels. That is, the subpixels can be divided into one or more subpixel groups, and the touch electrodes TE1, TE2, etc. may be arranged to overlap the groups.

In the connection structure of the subpixels, the 2n gate lines GL may be sequentially arranged such that a pair of gate lines interpose one subpixel row (which is defined as a horizontal line) in the second direction (the row direction) therebetween. Accordingly, a first horizontal line H1 may be defined by first and second gate lines GL1 and GL2, and a second horizontal line H2 may be defined by third and fourth gate lines GL3 and GL4. Accordingly, a horizontal line may include a front gate line and a rear gate line. When the front gate line is an odd-numbered line, the rear gate line is an even-numbered line. That is, a horizontal line may include an odd-numbered gate line and an even-numbered gate line. The 2n gate lines can define n horizontal lines of which each may include an odd-numbered gate line and an even-numbered gate line.

With reference to the FIG. 6 example, a red (R) subpixel connected to the first gate line GL1 in the first horizontal line H1 may neighbor a green (G) subpixel connected to the second gate line GL2, and both subpixels may be commonly connected to the first data line DL1. A blue (B) subpixel connected to the first gate line GL1 may neighbor a red (R) subpixel connected to the second gate line GL2, and both subpixels may be commonly connected to the second data line DL2.

A green (G) subpixel connected to the first gate line GL1 may neighbor a blue (B) subpixel connected to the second gate line GL2, and both subpixels may be commonly connected to the third data line DL3. A red (R) subpixel connected to the first gate line GL1 may neighbor a green (G) subpixel connected to the second gate line GL2, and both subpixels may be commonly connected to the fourth data line DL4. A blue (B) subpixel connected to the first gate line GL1 may neighbor a red (R) subpixel connected to the second gate line GL2, and both subpixels may be commonly connected to the fifth data line DL5.

In the second horizontal line H2, in the same manner as in the first horizontal line H1, the subpixels may be alternately connected to the third gate line GL3 and the fourth gate line GL4, and may share the data lines DL.

As such, the data lines DL1, DL2, DL3, ..., DL(m/2) may be connected to the subpixels to be shared by the left subpixels and the right subpixels, and two neighboring subpixels with the shared line interposed therebetween can be driven by the shared line. For example, in each of the first to $(M*m/2)^{th}$ data lines DL1, DL2, ..., DL(M*m/2), the subpixels can be driven from the left subpixel to the right subpixel. This scheme is referred to as a "ZZZ driving scheme" in the display device with the DRD structure.

An example in which the display device with a built-in touch screen according to an embodiment is driven using a vertical 2-dot inversion scheme to minimize flickering and to decrease power consumption will be described below.

When the display device with a built-in touch screen is driven using the dot inversion scheme, and a DC voltage is applied to both ends of liquid crystal (the common electrode, e.g., touch electrode, and the pixel electrodes), the liquid crystal is polarized. When this state is maintained, ionic impurities in the liquid crystal are fixed in place by an electric field to change pre-tilting, thereby deteriorating characteristics of the liquid crystal such as causing an afterimage. When this state is maintained, the liquid crystal loses liquid crystal characteristics and cannot function as a display device. The ionic impurities can be prevented from being fixed in place by periodically inverting the polarized states, and thus the polarized states can be inverted when the display device is driven using the dot inversion scheme.

That is, because the liquid crystal is polarized due to a relatively positive (+) value and a relatively negative (−) value based on a potential difference between both ends, it is possible to achieve a polarization inversion effect in which an AC voltage is supplied to the liquid crystal by inverting the relative values using a DC source voltage supplied from the system.

As illustrated in the example of FIG. 6, in the vertical 2-dot inversion driving scheme, the polarities of two gate lines GL1/GL2, GL3/GL4, ..., GL(2n-1)/GL(2n) may be inverted for each pair and the polarities of the data lines DL are inverted for each line, thereby inverting the states for each frame. Accordingly, the inversion driving may be performed such that the red (R) subpixel and the green (G) subpixel arranged in the first horizontal line H1 and connected to the first data line DL1 shown in the FIG. 6 example may have positive (+) values, and the red (R) subpixel and the green (G) subpixel arranged in the second horizontal line H2 and connected to the first data line DL1 may have negative (−) values.

In this way, in the display device with a built-in touch screen having the DRD structure according to an embodiment, because one data line may be shared by two subpixels, signals can be supplied to (M*n) pixels, each including m subpixels, and the number of data lines DL can be halved.

The display device with a built-in touch screen having the DRD structure according to an embodiment can invert the polarized state to improve an afterimage defect by employing the ZZZ driving of the dot inversion scheme. However, when the DRD structure is applied to the display device with a built-in touch screen, there is a problem in that the touch sensing lines overlap in boundaries between the touch electrodes and a luminance difference occurs between two touch electrodes due to a difference in parasitic capacitance between the touch electrodes and the touch sensing lines.

Figure 7:
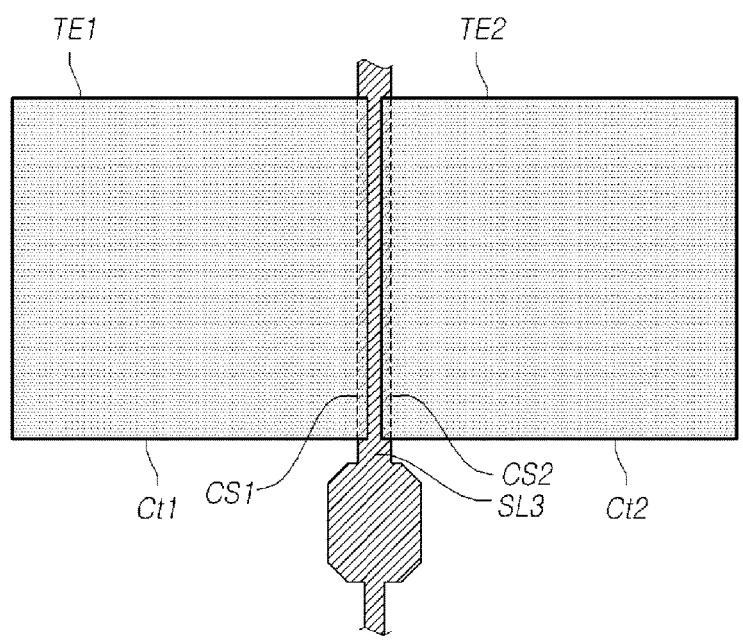
FIG. 7 is a diagram illustrating a state in which a touch sensing line is located between touch electrodes arranged in a display device with a built-in touch screen according to an embodiment of the present disclosure.

FIG. 7 is a diagram illustrating a state in which a touch sensing line is located between touch electrodes arranged in a display device with a built-in touch screen according to an embodiment of the present disclosure.

In the display device with a built-in touch screen illustrated in the FIG. 6 example, the touch electrodes are arranged in a block shape, and the data lines DL and the touch sensing lines SL are alternately arranged with one subpixel column interposed therebetween. Accordingly, the touch sensing line SL3 in FIG. 6 is located (at the boundary) between the first touch electrode TE1 and the second touch electrode TE2, and the touch sensing line SL3 overlap the first touch electrode TE1 and the second touch electrode TE2 by a predetermined area.

However, because the first and second touch electrodes TE1 and TE2 and the touch sensing line SL3 may be formed in different layers (for example, the touch electrodes and the touch sensing line may be formed with one or more insulating layers interposed therebetween), the overlapping area of the first touch electrode TE1 and the touch sensing line SL3 and the overlapping area of the second touch electrode TE2 and the touch sensing line SL3 are different from each other to cause a luminance difference.

As illustrated in the FIG. 7 example, a first parasitic capacitance CS1 due to the overlapping of the first touch electrode TE1 and the touch sensing line SL3 and a second parasitic capacitance CS2 due the overlapping of the second touch electrode TE2 and the touch sensing line SL3 may be different from each other. Thus, a first capacitance Ct1 of the first touch electrode TE1 and a second capacitance Ct2 of the second touch electrode TE2 may be different from each other.

In this way, when the capacitance of the first touch electrode TE1 and the capacitance of the second touch electrode TE2 are different from each other, a luminance difference between the touch electrodes occurs, which may cause a stained defect. In a display device with a built-in touch screen according to an embodiment, luminance unevenness between the touch electrodes can be fundamentally prevented by additionally disposing dummy subpixels and shifting the touch electrodes, such that no touch sensing line is located at the boundaries between the touch electrodes.

Figure 8:
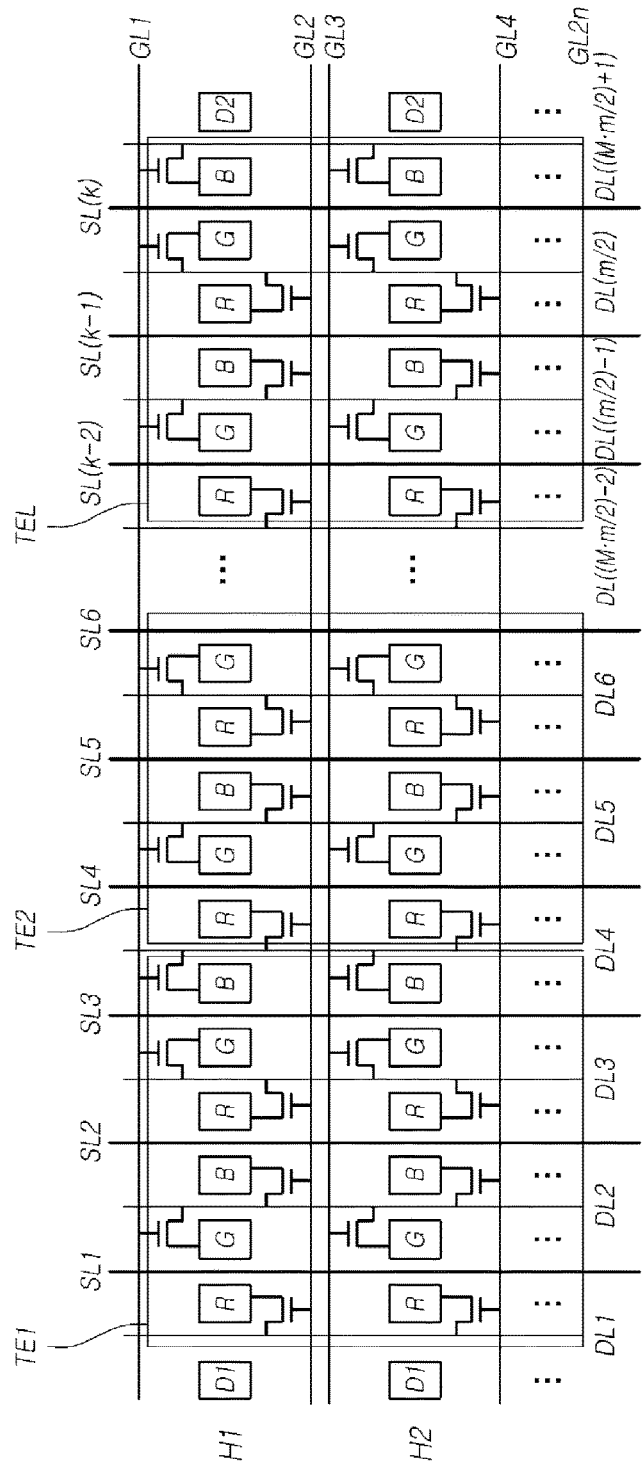
FIG. 8 is a diagram illustrating an arrangement of sub-pixels in a display device with a built-in touch screen according to an embodiment of the present disclosure.

FIG. 8 is a diagram illustrating an arrangement of subpixels in a display device with a built-in touch screen according to an embodiment of the present disclosure.

With reference to the FIG. 8 example, the display device with a built-in touch screen according to an embodiment can include red (R) subpixels, green (G) subpixels, blue (B) subpixels, first dummy subpixels (D1), and second dummy subpixels D2. In a display device with a built-in touch screen according to an embodiment, [(M*m/2)+1] data lines DL1, DL2, . . . , DL(M*m/2), DL([M*m/2)+1]) (where m is 3 or 4 and M is an even number when m is 3 and a natural number when m is 4) arranged to extend in the first direction (e.g., the column direction) and gate lines GL1, GL2, . . . , GL(2n) arranged to extend in the second direction (e.g., the row direction) may define subpixels. The touch sensing lines SL1, SL2, . . . , SLk along with the [(M*m/2)+1] data lines DL1, DL2, . . . , DL(M*m/2), and DL([(M*m/2)+1]) may be arranged with the subpixels to extend in the first direction (e.g., the column direction).

At both ends in the horizontal direction of the display panel, that is, on the left side of the first data line DL1 and the right side of the [(M*m/2)+1]$^{th}$ data line DL([M*m/2)+1]), the first dummy subpixels D1 and the second dummy subpixels D2 may be arranged in the first direction (e.g., the column direction). The first and second dummy subpixels D1 and D2 may be arranged in a horizontal line defined by each pair of gate lines among the 2n gate lines GL. Accordingly, the n first dummy subpixels D1 and the n second dummy subpixels D2 may be arranged, and the total number of dummy subpixels may be 2n. Accordingly, the total number of subpixels formed in the display panel is [(m*n)+2n] (e.g., the total number of dummy subpixels).

In the display panel, the touch electrodes TE1, TE2, . . . , TEL may be arranged in a block shape to correspond to the a plurality of subpixels. In the connection structure of the subpixels, the first horizontal line H1 may be defined by the first gate line GL1 and the second gate line GL2, the first dummy subpixel D1 may be disposed on the left of the first data line DL1, and a red (R) subpixel may be disposed on the right side of the first data line DL1.

The red (R) subpixel disposed on the right side of the first data line DL1 may be connected to the second gate line GL2, and the first dummy subpixel D1 and the red (R) subpixel may share the first data line. However, the first dummy subpixel D1 may be disposed to be electrically separated from the first gate line GL1 and the first data line DL1, and only the neighboring red (R) subpixel may be connected to the first data line DL1 and the second gate line GL2. A green (G) subpixel and a blue (B) subpixel may be disposed on the left side and the right side of the second data line DL2 to neighbor each other, where the green (G) subpixel may be connected to the first gate line GL1 and the blue (B) subpixel may be connected to the second gate line GL2.

A red (R) subpixel and a green (G) subpixel commonly connected to the third data line DL3 may be respectively connected to the second gate line GL2 and the first gate line GL1. A blue (B) subpixel and a red (R) subpixel commonly connected to the fourth data line DL4 may be respectively connected to the first gate line GL1 and the second gate line GL2. A green (G) subpixel and a blue (B) subpixel commonly connected to the fifth data line DL5 may be respectively connected to the first gate line GL1 and the second gate line GL2.

A blue (B) subpixel may be disposed on the left side of the [(M*m/2)+1]$^{th}$ data line DL([(M*m/2)+1]), and may be connected to the first gate line GL1. The second dummy subpixel D2 may be disposed on the right side of the [(M*m/2)+1]$^{th}$ data line DL([(M*m/2)+1]). The second dummy subpixel D2 may not be electrically connected to the first or second gate line GL1 or GL2 and the [(M*m/2)+1]$^{th}$ data line DL([M*m/2)+1]). That is, [(M*m/2)−1] data lines may be arranged in each of the horizontal lines of n rows of the subpixels, such that each data line may be shared by a pair of subpixels. In other words, except for the first data line DL1 and the [(M*m/2)+1]$^{th}$ data line DL([(M*m/2)+1]) disposed at the left end and the right end of the data lines arranged in each horizontal line, one data line may be shared by a pair of subpixels. In the second horizontal line H2, in the same manner as in the first horizontal line, the subpixels may be alternately connected to the third gate line GL3 and the fourth gate line GL4, and may share one data line DL.

In a display device with a built-in touch screen according to an embodiment, the first touch electrode TE1 among the touch electrodes TE1, TE2, . . . , TEL (where L is a natural number) may overlap portions of the first dummy subpixels D1 at the left end, the fourth data line DL4 may be located between the first touch electrode TE1 and the second touch electrode TE2, but no touch sensing line SL (e.g., SL1 to SL(k)) may be located therebetween. That is, by disposing the first and second dummy subpixels D1 and D2 and shifting the touch electrodes TE arranged in the display panel such that no touch sensing line SL is located at the boundaries of the touch electrodes TE, a difference in parasitic capacitance between the touch electrodes TE and the touch sensing lines SL may be prevented. As such, by preventing a difference in parasitic capacitance between the touch electrodes TE in this manner, it is possible to fundamentally prevent luminance unevenness which is caused between the touch electrodes.

When the connection structure of the subpixels arranged in a display device with a built-in touch screen according to the present disclosure is changed as described above with reference to the FIG. 8 example, the subpixels in the first and second horizontal lines H1 and H2 can be driven in a ZZ reverse Z(S) driving manner of the dot inversion scheme. That is, the subpixels arranged in each horizontal line may be driven using a mixture of driving from left to right of each data line, and driving from right to left of each data line.

Although will be described later, the subpixels may be arranged in each horizontal line such that the green (G) subpixels (e.g., weak-charged subpixels) may be connected to the odd-numbered gate line and the red (R) subpixels (e.g., strong-charged subpixels) may be connected to the even-numbered gate line, thereby improving a horizontal defect formed along the horizontal line (the horizontal direction). The blue (B) subpixels may be alternately connected to the odd-numbered gate line and the even-numbered gate line. The strong-charged subpixels and the weak-charged subpixels will be described later with reference to FIGS. 10 and 11.

Accordingly, the display device with a built-in touch screen according to an embodiment can realize the ZZ reverse Z(S) driving. For example, the first dummy subpixel D1 and the red (R) subpixel connected to the first data line DL in the first horizontal line H1 may be driven from left to right (e.g., the first dummy subpixel may not actually operate), and the first dummy subpixel D1 and the red (R) subpixel connected to the first data line DL1 in the second horizontal line H2 may be driven from left to right (e.g., the first dummy subpixel may not actually operate), thus driving in the Z direction. Then, the green (G) subpixels and the blue (B) subpixels commonly connected to the second data line DL2 in the first horizontal line H1 and the second horizontal line H2 may be driven from left to right, thus driving in the Z direction.

Then, the red (R) subpixels and the green (G) subpixels commonly connected to the third data line DL2 in the first horizontal line H1 and the second horizontal line H2 may be driven from right to left, thus driving in the reverse Z(S) direction. In this way, the display device with a built-in touch screen having the DRD structure according to an embodiment can be driven in the ZZ reverse Z(S) driving manner of the dot inversion scheme, thereby inverting the polarized states to improve an afterimage defect.

In the display device having the DRD structure, a pair of subpixels commonly connected to one data line may be structurally strong-charged and weak-charged. Accordingly, when the subpixels having the same color are repeatedly strong-charged, a horizontal defect may occur.

In an embodiment, the horizontal defect may be prevented by alternately arranging the blue (B) subpixels having low transmittance as a strong-charged subpixel and a weak-charged subpixel in the horizontal direction (e.g., H1, H2, etc.). This will be described below in more detail with reference to FIGS. 10 and 11. Particularly, in a display device with a built-in touch screen according to an embodiment, no touch sensing line SL may be located at the boundaries of the touch electrodes by arranging the first and second dummy subpixels and shifting the touch electrodes.

With further reference to the example of FIG. 8, the touch electrodes may be arranged to overlap the red (R), green (G), and blue (B) subpixels, and to overlap only portions of the first and second dummy subpixels D1 and D2. That is, by causing the first and second dummy subpixels D1 and D2 to overlap the touch electrodes TE in only some areas and shifting the neighboring touch electrodes, no touch sensing line is located at the boundaries of the touch electrodes. Accordingly, because the touch electrodes do not overlap the touch sensing lines SL in the boundary areas of the touch electrodes, generation of parasitic capacitance between the touch sensing lines and the touch electrodes may be prevented to improve luminance unevenness.

Figure 9:
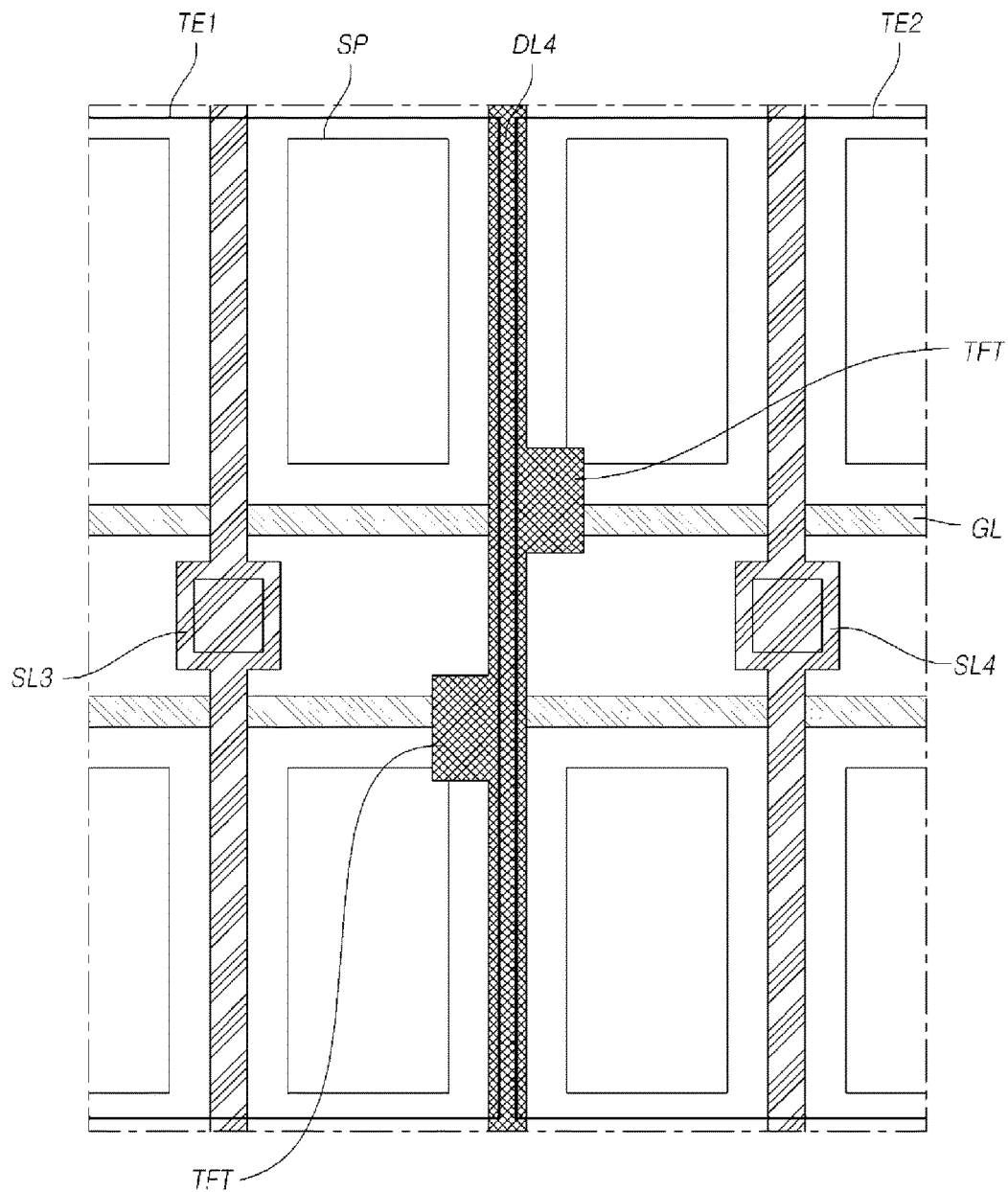
FIG. 9 is a diagram illustrating a region between touch electrodes arranged in a display device with a built-in touch screen according to an embodiment of the present disclosure.

FIG. 9 is a diagram illustrating a region between touch electrodes arranged in a display device with a built-in touch screen according to an embodiment of the present disclosure.

With reference to the FIG. 9 example, it can be seen that no touch sensing line may be located at the boundary between the first touch electrode TE1 and the second touch electrode TE2, and only the fourth data line DL4 is located at the boundary. This is also shown in the FIG. 8 example.

In an embodiment, the third touch sensing line SL3 and the fourth touch sensing line SL4, which are alternately arranged along with the fourth data line DL4, may be located in the first touch electrode TE1 and the second touch electrode TE2, respectively, and there may be no difference in the overlapping area between the first touch electrode TE1 and the second touch electrode TE2 with the touch sensing line.

As described above with reference to the example of FIG. 8, in an embodiment, the first dummy subpixels D1 and the second dummy subpixels D2 may be arranged in the first direction (e.g., the column direction) at the right and left ends of the display panel, and the overlapping areas of the touch electrodes overlapping therewith may be adjusted. Accordingly, it is possible to shift the positions of the touch electrodes arranged between the first dummy subpixels D1 and the second dummy subpixels D2 in the second direction (e.g., the row direction) such that no touch sensing line SL is located at the boundaries of the touch electrodes TE.

That is, in a display device with a built-in touch screen according to an embodiment, only the data lines may be disposed between the touch electrodes, and all the touch sensing lines SL may be arranged to overlap the touch electrodes. Accordingly, the data lines DL may be disposed between the touch electrodes, and transistors sharing each data line DL may come in contact with the subpixels on both sides (e.g., the right and left sides). Accordingly, in a display device with a built-in touch screen according to an embodiment, luminance unevenness between the areas corresponding to the touch electrodes may be prevented.

Accordingly, parasitic capacitance Cpara2 can be formed between the data line DL and the first and second touch electrodes TE1 and TE2. However, a distance between the data line DL and the first and second touch electrodes TE1 and TE2 is remarkably larger than the distance between the touch sensing line SL and the first and second touch electrodes TE1 and TE2. Accordingly, the parasitic capacitance Cpara2 between the data line DL and the first and second touch electrodes TE1 and TE2 is much smaller than the self-capacitance and thus can be ignored.

Figure 10:
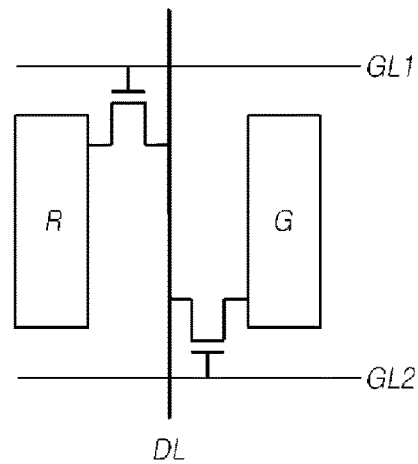
FIGS. 10 and 11 are diagrams illustrating a principle in which amounts of charge with which subpixels are charged are different according to an embodiment of the present disclosure.
Figure 11:
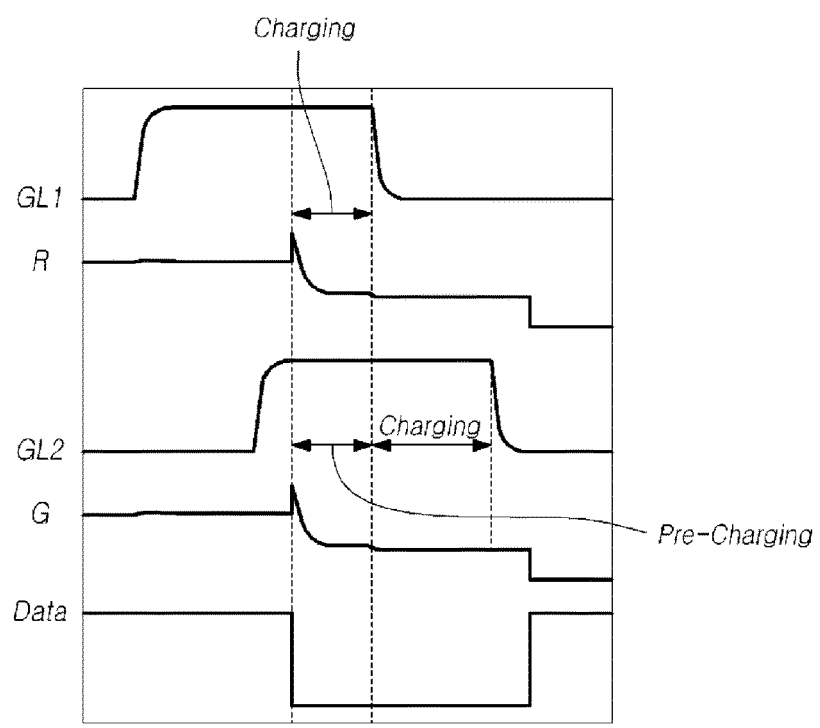

FIGS. 10 and 11 are diagrams illustrating a principle in which amounts of charge with which subpixels are charged are different according to an embodiment of the present disclosure.

With reference to the examples of FIGS. 10 and 11, in the DRD structure for decreasing the number of data lines, two subpixels may share one data line DL. As illustrated in FIG. 10, a red (R) subpixel may be disposed on the left side of the data line DL, and a green (G) subpixel may be disposed on the right side of the data line DL.

The red (R) subpixel may be connected to the first gate line GL1 and the data line DL, and the green (G) subpixel may be connected to the second gate line GL2 and the data line DL. In this connection structure, when a data signal is supplied via the data line DL, the green (G) subpixel may be charged stronger than the red (R) subpixel, as illustrated in FIG. 11.

In the display panel having the DRD structure, the 2n gate lines may be sequentially arranged, a pair of gate lines thereof may define a single horizontal line, and each horizontal line may include an odd-numbered gate line and an even-numbered gate line ((n+1)$^{th}$ gate line). That is, a pair of gate lines included in each horizontal line may be sequentially supplied with a gate signal (e.g., a scan signal) from the odd-numbered gate line to the even-numbered gate line.

For example, with reference to FIG. 11, a gate signal (e.g., an odd-numbered ("front") scan signal) supplied through the first gate line GL1 and a gate signal (e.g., an even-numbered ("rear") scan signal) supplied through the second gate line GL2 may partially overlap each other, and the red (R) subpixel connected to the first gate line GL1 may have no pre-charging section. Thus, the red (R) subpixel may be weak-charged with a data voltage Data. That is, the subpixel connected to the odd-numbered gate line GL1 may be a weak-charged subpixel.

On the other hand, the green (G) subpixel may be pre-charged in an overlap section of the gate signals, and may then be charged with the data voltage Data supplied through the second gate line GL2. Thus, the green (G) subpixel may be strong-charged. That is, the subpixel connected to the even-numbered gate line GL2 may be a strong-charged subpixel.

In the DRD structure in which a pair of subpixels shares one data line, a strong-charged subpixel and a weak-charged subpixel may be present, and a difference in a degree of charging may cause a luminance difference. Therefore, when a color that can be easily visually recognized is arranged in the strong-charged subpixel and the weak-charged subpixel, there may be a problem in that an image quality defect may be recognized due to a luminance difference thereof.

In an embodiment, by alternately arranging the blue (B) subpixels having low transmittance as the strong-charged subpixel and the weak-charged subpixel, a horizontal defect may be prevented. With further reference to FIG. 8, first dummy subpixel D1/red (R) subpixel, green (G) subpixel/blue (B) subpixel, red (R) subpixel/green (G) subpixel, blue (B) subpixel/red (R) subpixel, green (G) subpixel/blue (B) subpixel, and red (R) subpixel/green (G) subpixel may be arranged in this order along the first horizontal line H1 and the second horizontal line H2.

When the subpixels are classified into strong-charged subpixels and weak-charged subpixels based on the principle illustrated in FIGS. 10 and 11, the blue (B) subpixels may be arranged in an order of strong-charged subpixel/weak-charged subpixel/strong-charged subpixel/weak-charged subpixel along the first and second horizontal lines H1 and H2. That is, the blue (B) subpixels arranged in each horizontal line in the display panel according to an embodiment may be alternately connected to the odd-numbered gate line and the even-numbered gate line defining the horizontal line.

The red (R) subpixels may be arranged as strong-charged subpixels along the first and second horizontal lines H1 and H2. That is, the red (R) subpixels arranged in each horizontal line in the display panel according to an embodiment may be connected to the even-numbered gate line among the gate lines defining the horizontal line.

The green (G) subpixels having largest visual sensitivity based on a luminance difference may be arranged as the weak-charged subpixels. That is, the green (G) subpixels arranged in each horizontal line in the display panel according to an embodiment may be connected to the odd-numbered gate line among the gate lines defining the horizontal line.

Accordingly, by adjusting the colors corresponding to the strong-charged subpixels and the weak-charged subpixels in the display device with a built-in touch screen having the DRD structure according to an embodiment, it may be possible to improve a horizontal defect which is generated in the horizontal direction.

Figure 12:
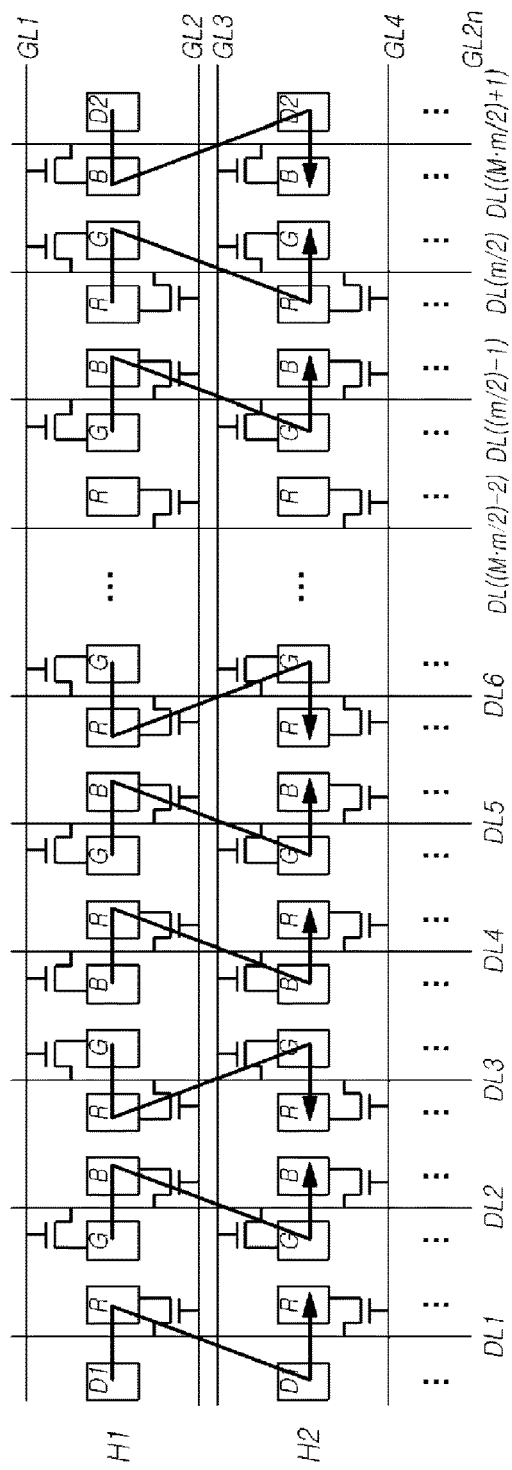
FIG. 12 is a diagram illustrating a driving scheme of a display device with a built-in touch screen and a color relationship of subpixels according to an embodiment of the present disclosure.
Figure 13:
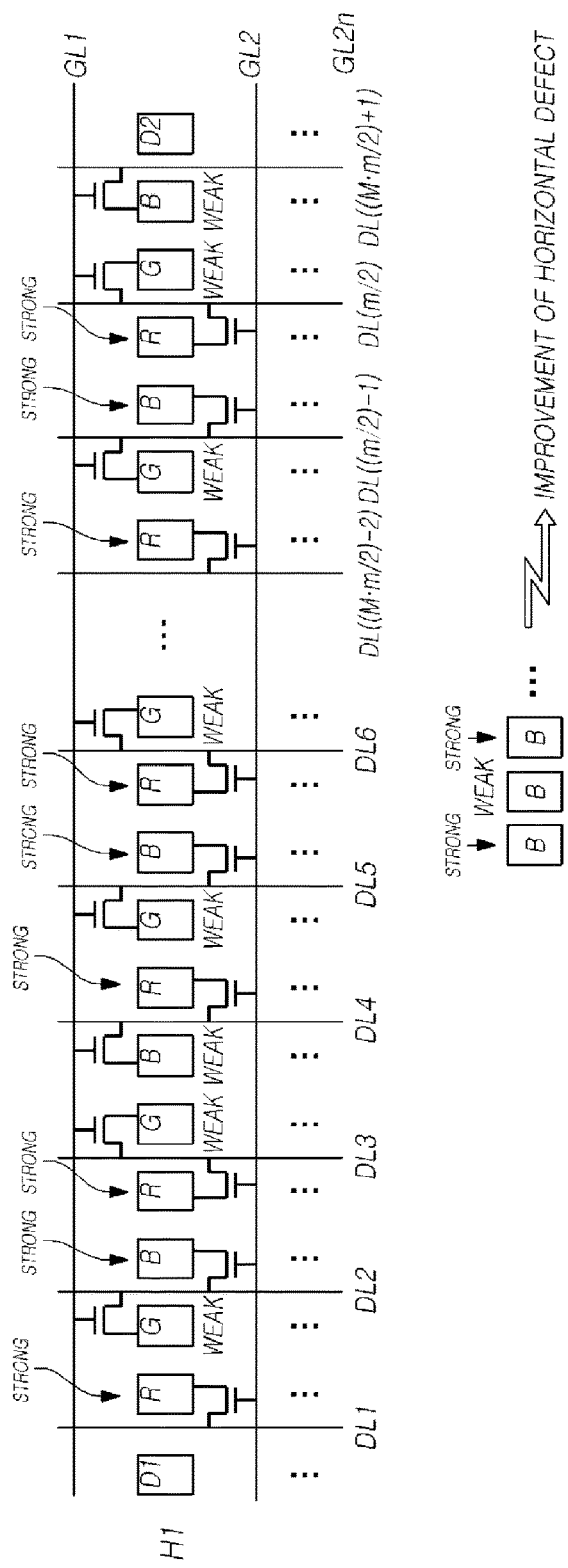
FIG. 13 is a diagram illustrating a principle in which a horizontal defect is prevented in a display device with a built-in touch screen according to an embodiment of the present disclosure.

FIG. 12 is a diagram illustrating a driving scheme of a display device with a built-in touch screen and a color relationship of subpixels according to an embodiment of the present disclosure. FIG. 13 is a diagram illustrating a principle in which a horizontal defect is prevented in a display device with a built-in touch screen according to an embodiment of the present disclosure.

With reference to the examples of FIGS. 12 and 13, in a display device with a built-in touch screen according to an embodiment, the subpixels may be arranged in an order of first dummy subpixel/red (R) subpixel, green (G) subpixel/blue (B) subpixel, green (G) subpixel/blue (B) subpixel, green (G) subpixel/red (R) subpixel, blue (B) subpixel/red (R) subpixel, green (G) subpixel/blue (B) subpixel, green (G) subpixel/red (R) subpixel, blue (B) subpixel/red (R) subpixel, . . . , blue (B) subpixel/red (R) subpixel, green (G) subpixel/blue (B) subpixel, green (G) subpixel/red (R) subpixel, and blue (B) subpixel/second dummy subpixel D2 along the first and second horizontal lines H1 and H2, as illustrated in the FIG. 8 example.

That is, along the horizontal lines H1, H2, etc. in a display device with a built-in touch screen according to an embodiment, the red (R) subpixels may correspond to the strong-charged subpixels and the green (G) subpixels may correspond to the weak-charged subpixels. To improve a horizontal defect, the blue (B) subpixels may be alternately arranged to correspond to the strong-charged subpixel and the weak-charged subpixel.

In the above-mentioned arrangement of the red (R), green (G), and blue (B) subpixels according to an embodiment, because no touch sensing line SL not located at the boundaries of the touch electrodes TE while the ZZ reverse Z(S) driving of the dot inversion scheme is performed, it is possible to prevent a defect of luminance unevenness. The arrows in FIG. 12 show the "Z" and "reverse Z" ordering.

As illustrated in the FIG. 12 example, the following can be described for the driving direction along the first horizontal line H1 and the second horizontal line H2 of the display panel. The first dummy subpixel D1 and the red (R) subpixel disposed in the first data line DL1 may be driven from left to right (no signal is actually supplied to the first dummy subpixel), and the first dummy subpixel D1 and the red (R) subpixel disposed in the first data line DL1 in the second horizontal line H2 may be driven from left to right (no signal is actually supplied to the first dummy subpixel). This is Z-direction driving.

As described above with reference to FIGS. 10 and 11, the red (R) subpixel connected to the first data line DL1 may function as a strong-charged subpixel by the gate signal supplied to the first and second gate lines GL1 and GL2. Because the green (G) subpixel and the blue (B) subpixel commonly connected to the second data line DL2 may be driven from left to right, the green (G) subpixel may function as a weak-charged subpixel, and the blue (B) subpixel may function as a strong-charged subpixel. Because the red (R) subpixel and the green (G) subpixel commonly connected to the third data line DL3 may be driven from right to left, the red (R) subpixel may function as a strong-charged subpixel, and the green (G) subpixel may function as a weak-charged subpixel. In this manner, in a display device with a built-in touch screen having the DRD structure according to an embodiment, because the ZZ reverse Z(S) driving may be repeatedly performed along the first and second horizontal lines H1, H2, etc., the polarized states can be inverted to improve an afterimage defect.

In a display device with a built-in touch screen according to an embodiment, along the first and second horizontal lines H1, H2, etc., all of the red (R) subpixels may correspond to the strong-charged subpixels, all of the green (G) subpixels may correspond to the weak-charged subpixels, and the blue (B) subpixels may alternately correspond to the strong-charged subpixel and the weak-charged subpixel, thereby improving the horizontal defect.

Figure 14:
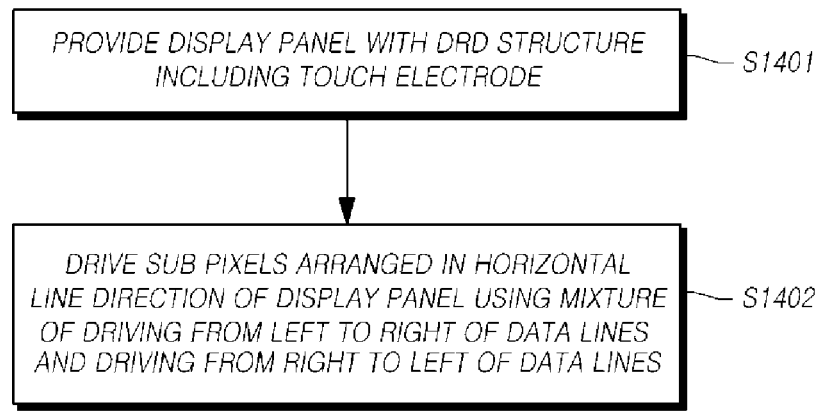
FIG. 14 is a diagram illustrating a driving method of a display device with a built-in touch screen according to an embodiment of the present disclosure.

FIG. 14 is a diagram illustrating a driving method of a display device with a built-in touch screen according to an embodiment of the present disclosure.

With reference to the FIG. 14 example, the driving method of the display device with a built-in touch screen according to an embodiment may include providing a display panel including a substrate having a display area, (M*n) pixels of which may each include m subpixels in the display area (where m is 3 or 4, and M is an even number when m is 3 and is a natural number when m is 4), [(M*m/2)+1] data lines arranged on the substrate, 2n gate lines (where n is a natural number) that cross the data lines on the substrate, and a plurality of touch electrodes that may be arranged on the substrate (S1401).

The display panel may have the DRD structure which has been described above with reference to the FIG. 8 example, and may include subpixels, a plurality of touch electrodes arranged to correspond to the first and second dummy subpixels, and a plurality of touch sensing lines alternately arranged along with the data lines with the subpixels interposed therebetween to supply a touch driving signal to the touch electrodes. The driving method of a display device with a built-in touch screen according to an embodiment may include driving the subpixels arranged in each horizontal line of the display panel using a mixture of driving from left to right of each data line and driving from right to left of each data line (S1402).

Each horizontal line may be defined by a pair of gate lines including an odd-numbered gate line and an even-numbered gate line of the 2n gate lines, and subpixels may be arranged on the right and left sides of each data line. For example, in a display device with a built-in touch screen according to an embodiment, when the red (R), green (G), and blue (B) subpixels arranged in each horizontal line are driven using the above-mentioned mixture, no data voltage may be supplied to the first and second dummy subpixels D1 and D2. That is, the first and second dummy subpixels D1 and D2 may not actually operate.

In a display device with a built-in touch screen according to an embodiment and the driving method thereof, because no touch sensing line SL may be located at the boundaries of the touch electrodes by arranging the first and second dummy subpixels in the display panel and shifting the touch electrodes, it is possible to prevent a capacitance difference from being generated between the touch electrodes.

In a display device with a built-in touch screen according to an embodiment and the driving method thereof, it is possible to decrease the number of output channels (the number of data lines) of the data driver and to decrease power consumption by driving the display device using the mixed method of Z-inversion and reverse Z(S)-inversion of the double-rate driving (DRD) system. In a display device with a built-in touch screen according to an embodiment and the driving method thereof, it is possible to prevent a horizontal defect generated in a horizontal direction by adjusting the colors corresponding to the strong-charged subpixels and the weak-charged subpixels among the subpixels arranged in the display panel.

It will be apparent to those skilled in the art that various modifications and variations may be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. A display device with a built-in touch screen, comprising:
   a substrate comprising a display area;
   (M*n) pixels, each comprising m subpixels in the display area, where:
   M is a number of 3 or more,
   n is a natural number,
   m is 3 or 4, and
   M is an even number when m is 3 and is a natural number when m is 4;
   [(M*m/2)+1] data lines on the substrate;
   2n gate lines that cross the data lines on the substrate; and
   a plurality of touch electrodes on the substrate,
   wherein each of n rows of the subpixels is defined by an odd-numbered gate line and an even-numbered gate line that are continuous among the 2n gate lines,
   wherein a horizontal line corresponding to each of the n rows of the subpixels is connected to [(M*m/2)−1] data lines, such that each data line among the [(M*m/2)−1] data lines is shared by a pair of subpixels,
   wherein a boundary data line among the [(M*m/2)−1] data lines is located in a boundary between two touch electrodes among the plurality of touch electrodes, and
   wherein a pair of the subpixels sharing a data line and being driven correspond to respective different touch electrodes across the boundary between the two touch electrodes.

2. The display device of claim 1, wherein the data lines are between the touch electrodes.

3. The display device of claim 1, wherein the first data line and the $[(M*m/2)+1]^{th}$ data line are at both edges in a horizontal direction of the display area of the substrate.

4. The display device of claim 3, further comprising first and second dummy subpixels outside the first data line and the $[(M*m/2)+1]^{th}$ data line at both edges in the horizontal direction of the display area.

5. The display device of claim 4, wherein the first and second dummy subpixels are at both edges of each horizontal line.

6. The display device of claim 5, wherein a red subpixel among the subpixels is connected to the first data line and the even-numbered gate line in each horizontal line.

7. The display device of claim 4, wherein the first and second dummy subpixels are respectively electrically isolated from the first data line and the $[(M*m/2)+1]^{th}$ data line.

8. The display device of claim 4, wherein:
the subpixels overlap the plurality of touch electrodes; and
the first and second dummy subpixels partially overlap the touch electrodes.

9. The display device of claim 1, further comprising a plurality of touch sensing lines alternately arranged along with the data lines with the subpixels in a column direction to supply a touch driving signal to the plurality of touch electrodes.

10. The display device of claim 9, wherein the touch sensing lines are not located in boundaries between the touch electrodes.

11. The display device of claim 1, wherein:
the subpixels in each horizontal line are classified into:
weak-charged subpixels connected to the odd-numbered gate line; and
strong-charged subpixels connected to the even-numbered gate line; and
blue (B) subpixels among the subpixels in each horizontal line are alternately the strong-charged subpixels and the weak-charged subpixels.

12. The display device of claim 1, wherein:
the subpixels in each horizontal line are classified into:
weak-charged subpixels connected to the odd-numbered gate line; and
strong-charged subpixels connected to the even-numbered gate line, and
red (R) subpixels among the subpixels arranged in each horizontal line are the strong-charged subpixels.

13. The display device of claim 1, wherein:
the subpixels in each horizontal line are classified into:
weak-charged subpixels connected to the odd-numbered gate line; and
strong-charged subpixels connected to the even-numbered gate line, and
green (G) subpixels among the subpixels arranged in each horizontal line are the weak-charged subpixels.

14. A driving method of a display device with a built-in touch screen, the display device comprising: a substrate comprising a display area, (M*n) pixels, each comprising m subpixels in the display area, where: M is a number of 3 or more, n is a natural number, m is 3 or 4, and M is an even number when m is 3 and is a natural number when m is 4, $[(M*m/2)+1]$ data lines on the substrate, 2n gate lines that cross the data lines on the substrate, and a plurality of touch electrodes on the substrate, each of n rows of the subpixels being defined by an odd-numbered gate line and an even-numbered gate line that are continuous among the 2n gate lines, a horizontal line corresponding to each of the n rows of the subpixels being connected to $[(M*m/2)-1]$ data lines, such that each data line among the $[(M*m/2)-1]$ data lines is shared by a pair of subpixels, a boundary data line among the $[(M*m/2)-1]$ data lines being located in a boundary between two touch electrodes among the plurality of touch electrodes, the driving method comprising:
driving the subpixels arranged in each horizontal line using a mixture of:
driving from left to right of each data line; and
driving from right to left of each data line,
wherein a pair of the subpixels sharing a data line and being driven correspond to respective different touch electrodes across the boundary between the two touch electrodes.

15. The driving method of claim 14, wherein:
the display device further includes first and second dummy subpixels outside the first data line and the $[(M*m/2)+1]^{th}$ data line disposed at both edges in the horizontal direction of the display area; and
the first and second dummy subpixels are not supplied with a data voltage during driving.

16. The driving method of claim 14, wherein:
the subpixels in each horizontal line are classified into:
weak-charged subpixels connected to the odd-numbered gate line; and
strong-charged subpixels connected to the even-numbered gate line; and
blue (B) subpixels among the subpixels arranged in each horizontal line are alternately the strong-charged subpixels and the weak-charged subpixels.

17. The driving method of claim 14, wherein:
the subpixels in each horizontal line are classified into:
weak-charged subpixels connected to the odd-numbered gate line; and
strong-charged subpixels connected to the even-numbered gate line; and
red (R) subpixels among the subpixels in each horizontal line are the strong-charged subpixels.

18. The driving method of claim 14, wherein:
the subpixels in each horizontal line are classified into:
weak-charged subpixels connected to the odd-numbered gate line; and
strong-charged subpixels connected to the even-numbered gate line; and
green (G) subpixels among the subpixels in each horizontal line are the weak-charged subpixels.

19. A display device including a built-in touch screen, comprising:
a substrate comprising a display area;
(M*n) pixels, each comprising m subpixels in the display area, where:
n is a natural number,
m is 3 or 4, and
M is an even number when m is 3, and is a natural number when m is 4;
$[(M*m/2)+1]$ data lines on the substrate;
2n gate lines that cross the data lines on the substrate;
a plurality of touch electrodes on the substrate; and
a plurality of touch sensing lines,
wherein each of n rows of the subpixels is defined by an odd-numbered gate line and an even-numbered gate line that are continuous among the 2n gate lines,
wherein a horizontal line corresponding to each of the n rows of the subpixels is connected to $[(M*m/2)-1]$ data lines, such that each data line among the $[(M*m/2)-1]$ data lines is shared by a pair of subpixels, wherein each of the touch sensing lines on each touch electrode is between two subpixels corresponding to the respective touch electrode, wherein a data line among the $[(M*m/2)-1]$ data lines is located in a boundary between two touch electrodes among the plurality of touch electrodes, and wherein a pair of the subpixels sharing a data line and being driven correspond to respective different touch electrodes across the boundary between the two touch electrodes.

* * * * *